Sept. 1, 1959 W. E. FROMM 2,902,641
METHOD OF ORIENTATION OF DETECTOR MAGNETOMETER
ELEMENT WITH HIGH ACCURACY
Filed July 22, 1955 6 Sheets-Sheet 2

INVENTOR.
WINFIELD E. FROMM

United States Patent Office 2,902,641
Patented Sept. 1, 1959

2,902,641

METHOD OF ORIENTATION OF DETECTOR MAGNETOMETER ELEMENT WITH HIGH ACCURACY

Winfield E. Fromm, Hempstead, N.Y., assignor, by mesne assignments, to the United States of America as represented by the Secretary of the Navy Application July 22, 1955, Serial No. 523,948

4 Claims. (Cl. 324—43)

This invention relates to the art of testing electronic equipment and more particularly to testing an airborne electronic set for detecting the magnetic influence of submerged or surfaced submarines.

In accordance with this invention, an auxiliary test circuit causes the detector magnetometer of the detecting set to be displaced a relatively large angle (about 20 degrees) from its normal oriented position. This is done by displacing the gimbal under test first on one direction; then in the opposite direction. The magnetic fields at the two extreme positions are compared. Electrical adjustments are made in the servo amplifier under test so as to equalize the two readings. When equal, the detector magnetometer has been displaced from the earth field vector as a norm, and the detector is properly oriented. The orientation may be done with great sensitivity, or alternatively, with normal sensitivity, in regions of relatively high noise.

It is the primary object of this invention to provide a new and improved method for making proper adjustments of the orientation controls of a magnetic airborne detecting set.

Another object of this invention is to provide a new auxiliary test circuit for testing a magnetic airborne detecting set.

Several methods of orientation have been used in previous magnetic airborne detecting equipment but usually these methods were ineffective, or at least inaccurate, in regions where the magnetic noise level was above one gamma. It is therefore an object of this invention to provide an apparatus and method for accurately orienting a detector magnetometer element even in regions of relatively high magnetic noise.

Other objects and many of the attendant advantages of this invention will be readily appreciated as the same becomes better understood by reference to the following detailed description when considered in connection with the accompanying drawings wherein.

The detecting set under test indicates the presence of submerged or surfaced submarines. It is sufficiently sensitive so that such submarines may often be accurately tracked despite evasive tactics at relatively high speeds.

Specifically, the equipment detects the magnetic field surrounding any submarine or vessel of steel construction. Such a field may be weak or strong, depending on the magnetic history of the vessel and its present position, but in any case that field is always much smaller than the magnetic field of the earth itself. The earth's magnetic field and the submarine's field are both present in the immediate vicinity of the submarine, while at some distance the submarine's field becomes negligible and only the earth's field remains. Therefore, submarine detection depends on detecting the small disturbance in the normal earth's magnetic field that is caused by the weaker field of the submarine. The detecting equipment must detect this small disturbance as the aircraft flies along.

Figure 2:
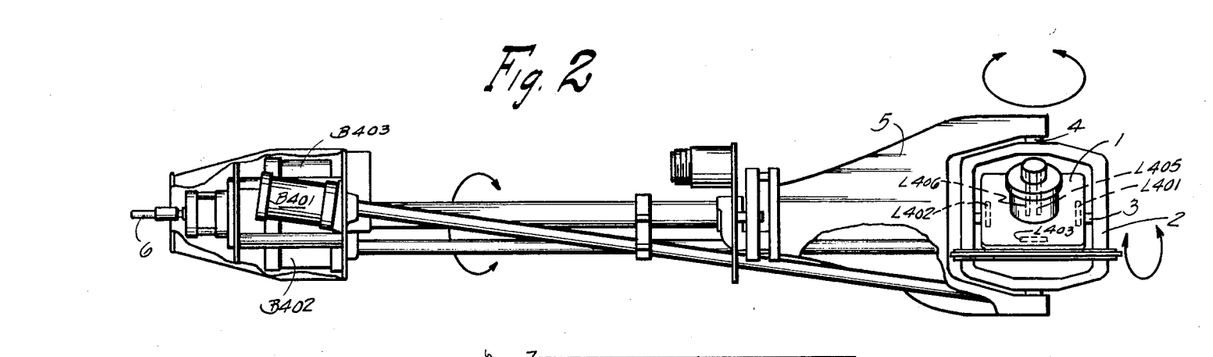
Figure 2 is an elevation of the detecting head of the detecting set.
Figure 4:
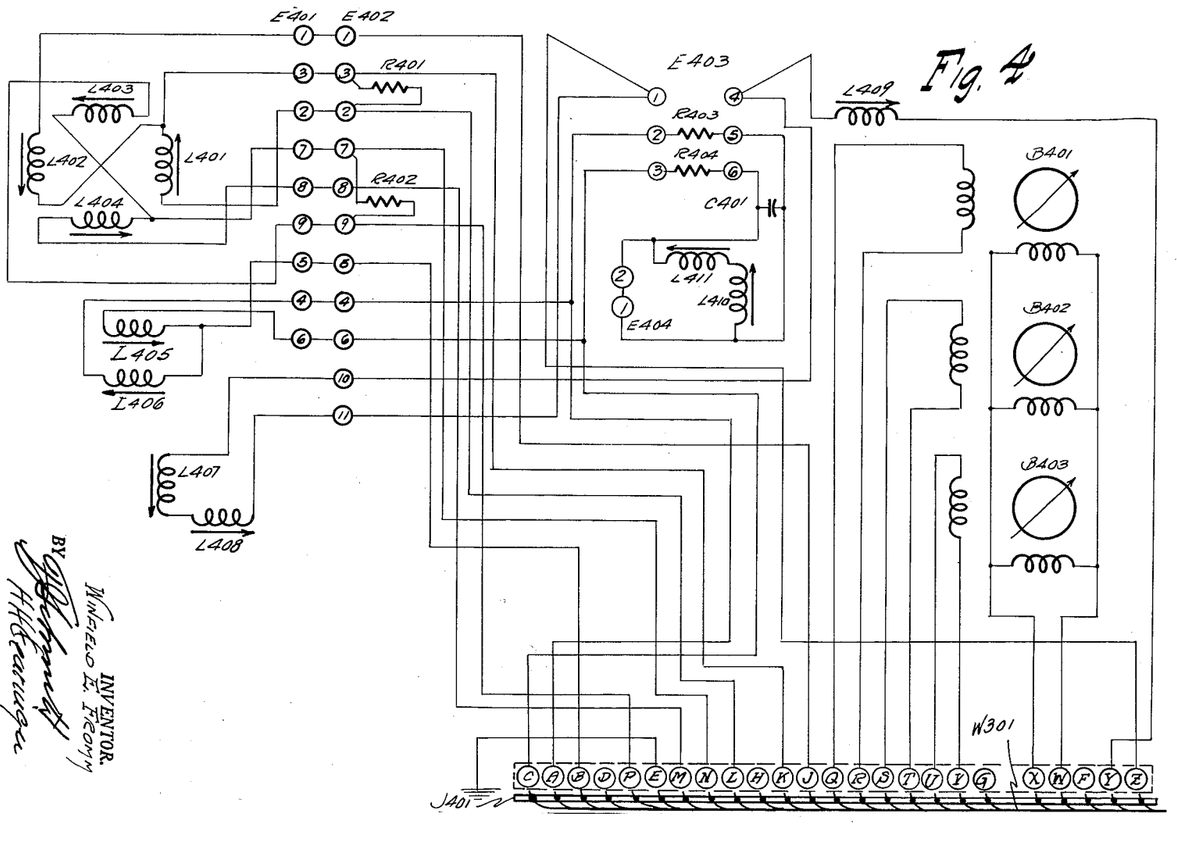
Figure 4 is a schematic diagram of the detecting head of the magnetic detecting set.

Referring now in greater detail to Figures 2 and 4, there is shown the detecting head of the detecting set under test. This unit carries the detector magnetometer coils L405 and L406 which detect the magnetic field of a submarine. The detector magnetometer is mounted on mica filled phenolic plate 1. In the operation of the detecting head this plate is maintained perpendicular to the earth's magnetic field by a servo system. The detector magnetometer is mounted so that it is perpendicular to the plate, consequently it will be parallel to the earth's magnetic field when the plate is properly oriented to be perpendicular to the earth's magnetic field. The purpose of the three axis gimbal system is to maintain the detector magnetometer aligned precisely in the direction of the earth's magnetic field during all flight maneuvers.

The position of plate 1 is controlled by servo motors B401, B402, and B403 which actuate the plate and the gimbals within which plate 1 is mounted. Plate 1 is pivoted at 3 about a first axis gimbal 2 and is oriented with respect to gimbal 2 by first axis servo motor B401; gimbal 2 is pivoted at 4 about a second axis support 5 and is oriented with respect to support 5 by second axis servo motor B402; and support 5 is rotated about a third axis with respect to supporting pin 6 by third axis servo motor B403. It can be seen that if the head is mounted on an aircraft in the direction of flight, then the first axis will always be directed fore and aft and consequently will be called upon to compensate for rolls. The second axis will then be perpendicular to the direction of flight and will compensate for pitch maneuver.

For the purpose of servo-controlling plate 1, orientor magnetometers L401, L402, L403 and L404 are mounted in the form of a square within plate 1. There are four strips, each strip with its own driving coil. Each pair of strips controls the servo action of one axis, the 1st axis pair controlling the servo motor action of the 1st axis and the 2nd axis pair controlling the servo motor action of the 2nd axis. For each axis, the servo motor operates when necessary in such direction as to maintain its pair of strips in the plate perpendicular to the earth's field (and consequently in such a position as to keep the orientor strips in a zero field position). The result is that both pairs are at right angles to the earth's field.

Electronic control amplifier

Figure 5A:
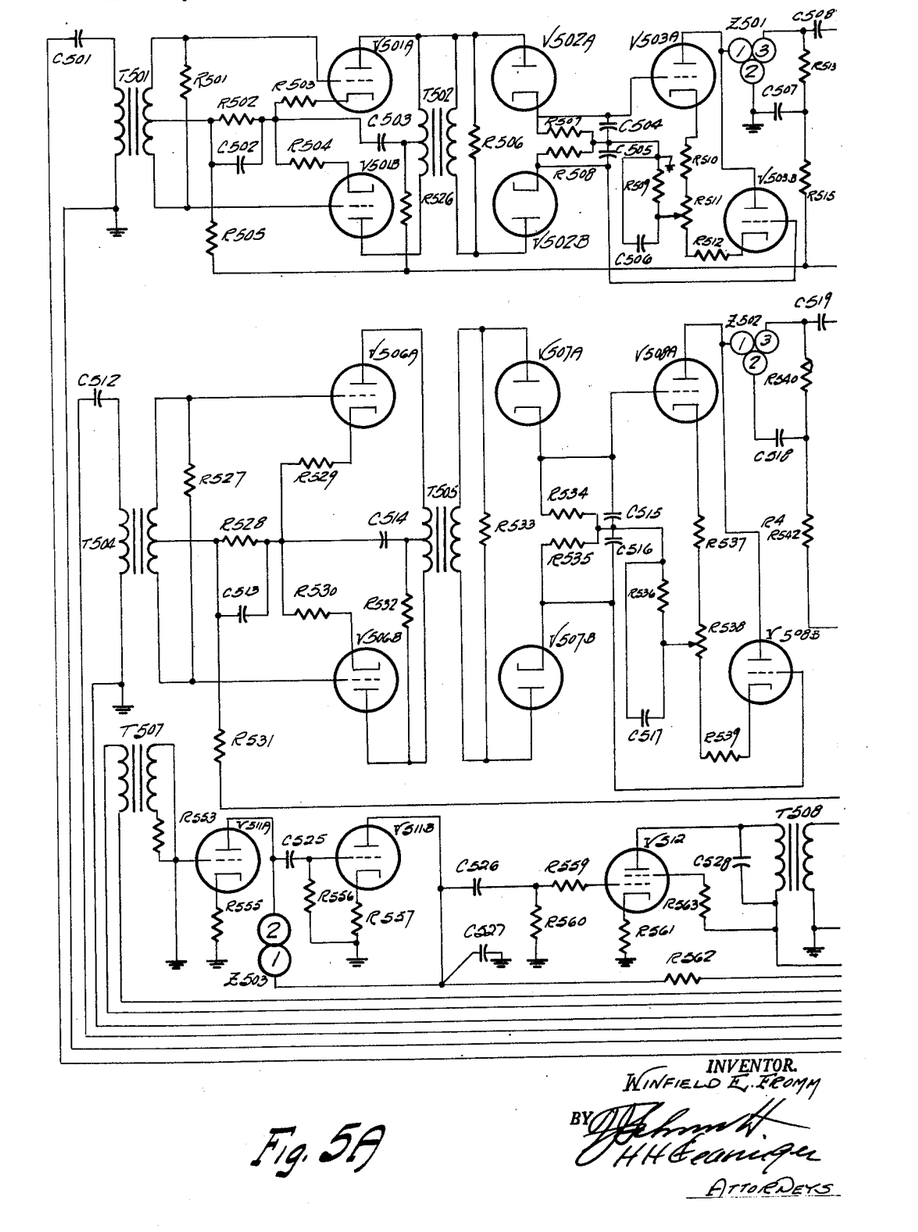
Figures 5A and 5B when placed side by side show a schematic diagram of the electronic control amplifier of the magnetic detecting set.
Figure 5B:
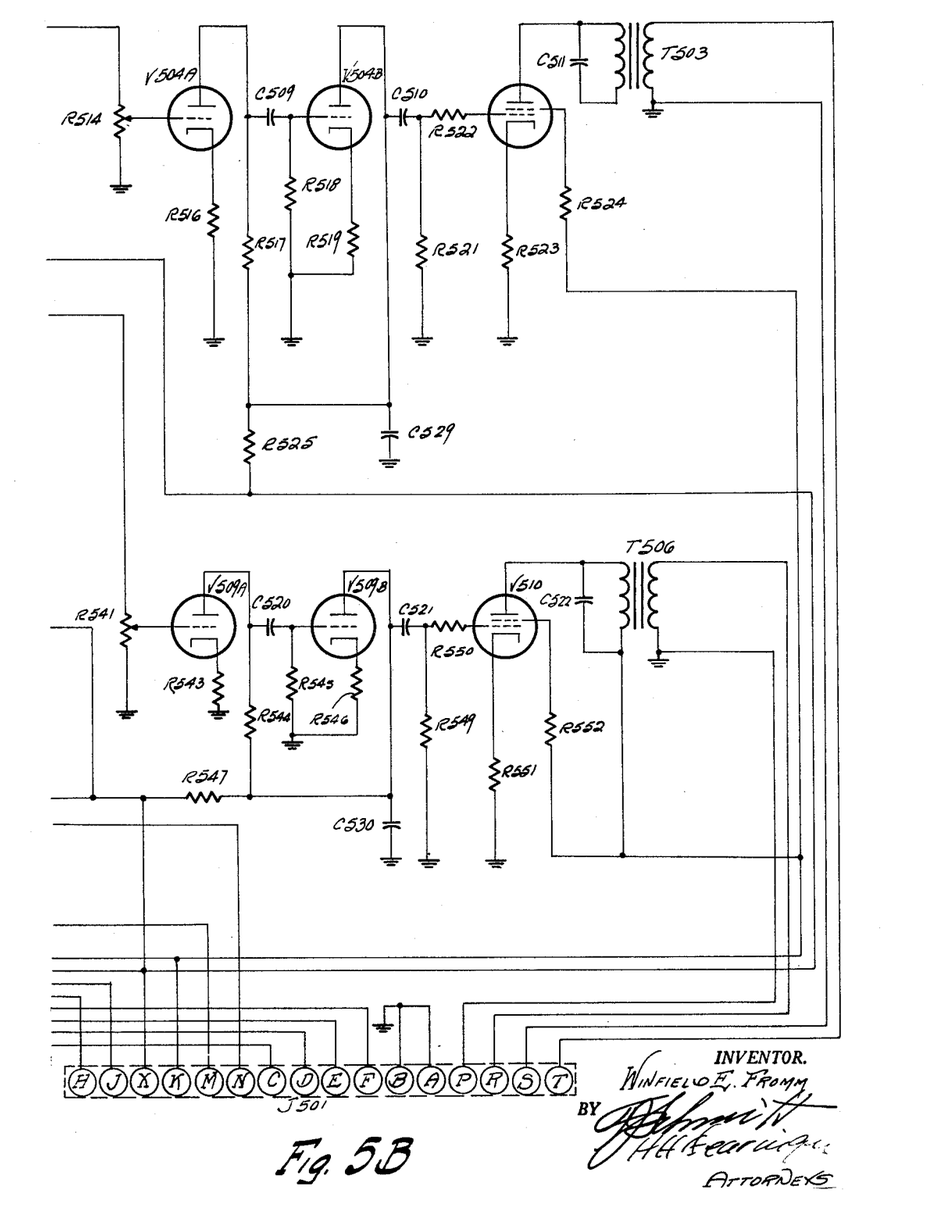

As viewed in Figures 5A and 5B the electronic control amplifier contains two amplifier channels to supply 400-c.p.s. power to the variable fields of the inner and outer axis servo motors, and an amplifier channel to supply 400-c.p.s. power to the variable field of the 3rd axis motor.

The inner orientor channel, consisting of V501, V502, V503, V504, and V505, and the outer orientor channel, consisting of V506, V507, V508, V509, and V510, are identical, and therefore the description will be confined to the inner channel.

Signal for the servo amplifier, consisting of the magnetically sensitive positive and negative voltage pulses, is picked up by T501 through C501. The pulse amplitude is stepped up by T501 so that at each grid there appear pulses of about 18 volts peak-to-peak. R501 is placed across the secondary of T501 to provide the proper secondary impedance. V501 is a transformer coupled amplifier with a great deal of negative feedback for stability, provided by unbypassed cathode resistors R503 and R504. R505 and R502 supply positive bias to the grids, necessitated by the large D.-C. voltage drop across R503 and R504. C502 is an A.-C. bypass for R502. R526 and C503 provide some decoupling for the plate supply voltage against 400-c.p.s ripple. The voltage gain of the stage is about 2. This stage serves primarily to drive the diode stage V502 without excessively loading the input.

Transformer T502 is a step-down transformer which provides an output impedance of about 500 ohms for the diodes. R506, together with V502 and its load, provide approximately the correct impedance for T502.

The pulses across each half of T502 are equal, but of opposite polarity with respect to ground. V502A will conduct on the first pulse, which makes its plate positive, and V502B will conduct on the second pulse, which makes its plate positive. The second pulse follows the first by one-half cycle of the 400-c.p.s. orientor driving voltage. No current flows through the diodes when negative pulses appear across them. Capacitors C504 and C505 charge up to the peak positive voltage of the pulse when their respective diodes conduct, and lose charge relatively slowly through resistors R507 and R508 until recharged by the next positive pulse. Hence, voltages appearing across the diode loads will be approximately sawtooth, as shown. These saw-tooth voltages have 400-c.p.s. fundamental components and also have 800-c.p.s. and higher order components. Because the saw-tooth voltages from V502B occur half a cycle after those from V502A, the 400-c.p.s. fundamental components of the two waves are of opposite phase, and of equal amplitude for equal positive and negative pulses, and equal time constants.

The saw-tooth voltages are fed to the grids of V503A and V503B, and the outputs of these two triodes are connected to add. If the gain of V502A equals that of V502B, the 400-c.p.s. fundamentals will cancel in the output, leaving only 800-c.p.s. and higher harmonics. If the incoming positive and negative pulses should be unequal, or if the gain of V502A were different from that of V502B, then the 400-c.p.s. will no longer exactly cancel, and there will be some 400-c.p.s. present in the common output of V502. This 400-c.p.s. voltage will be phased corresponding to the side with the larger pulse or the higher gain. For equal gain in V502A and V502B, the 400-c.p.s. in the output represents in both magnitude and phase any unbalance in pulse heights resulting from misorientation of the gimbal in the earth's field.

When amplified and fed to the variable field of the servo motor, this 400-c.p.s. voltage may be made to drive the motor until the orientor magnetometer is returned to zero field, and the pulse heights are again equal. The remainder of the amplifier channel serves to accomplish this purpose.

Unbypassed cathode resistors R510 and R512 and potentiometer R511 provide negative feedback which alters the gain of V503A and V503B. By means of R511, the cathode resistance may be increased in one side and decreased in the other. Hence, the relative gain of the two halves of V502 may be adjusted. Common cathode resistor R509 is bypassed by C506 and hence does not affect the A.-C. gain. The output of V503 is fed to low-pass filter Z501, which freely passes 400-c.p.s., but attenuates 800-c.p.s. by about 50 db and all higher frequencies by at least 40 db. Direct plate voltage for V503 is obtained from the supply through decoupling network R515 and C507, through R513, and Z501. R513 provides the proper load impedance for Z501.

The 400-c.p.s. output of Z501 is fed through coupling condenser C508 to the potentiometer R514, which controls the gain of the amplifier channel.

V504A and V504B perform as a two-stage resistance-coupled amplifier with some negative feedback, and its output feeds the power tube V505. This tube supplies 400-c.p.s. power to the variable field of the servo motor through matching transformer T503. The inductance of the motor winding is reflected from the secondary of T503 to the primary, where it is resonated at 400-c.p.s. by C511. This makes the tube load look like a resistance at 400-c.p.s., and allows the maximum power to be transferred to the servo motor. Various phase shifts through the entire system are such that the current though the variable field winding is displaced by 90° from the current through the constant field winding without the use of auxiliary phase-shifting devices. This phase relationship is the necessary one for operating the servo motor.

Cathode resistor R523 of V505 is unbypassed for increased stability. Resistor R522 is a parasitic suppressor and is mounted at the tube socket. Screen voltage is supplied to V505 through dropping resistor R524. The screen is unbypassed, which introduces further degeneration and hence stability. Direct plate voltage is supplied through the primary of T503. Both plate and screen supplies are obtained through decoupling network L301 and C302 located on the rack. This decoupling isolates the power circuits of the servo system from the remainder of the equipment and prevents interaction between the servo system and the signal circuits.

Suppose that the detector magnetometer axis were misaligned by 5 minutes of arc from true perpendicularity to the axis of one of the orientor magnetometers. Then, to maintain the detector axis parallel to the earth's field, that orientor element must align itself at a corresponding angle from true perpendicularity to the earth's field. In that position the pulse heights from the magnetometer will be slightly unbalanced, and the servo system must be made to seek that position. To accomplish this, control R511 is used to unbalance the gains of V502A and V502B by the proper amount and in the proper direction so that the 400 c.p.s. in the common output of V502A and V502B will cancel when the incoming pulses have the desired unbalance, and none other. Then the servo system will always operate to bring the orientor into the desired position.

With high gain in the servo amplifier, a small misorientation of the gimbal would produce a large torque on the servo motor, which would drive the gimbal rapidly toward its proper position. Mechanical inertia of the gimbal would carry it past the proper point, and the action would reverse itself, with the result that the gimbal might "hunt," or oscillate about the correct position. To prevent "hunting," it is necessary that the servo system apply to the gimbal a restraining torque as it approaches balance. The "rate circuit," consisting of C504 and R507 in the cathode of V502A and C505 and R508 in the cathode of V502B, produces this effect and also improves the servo response to rapid maneuvers. It operates as follows:

Referring to Fig. 5, suppose that, due to a sudden and rapid misorientation, the pulses to which V502A responds increased rapidly, while the pulses to which V502B responds decreased correspondingly. The magnitude of the 400-c.p.s. saw-tooth voltages at V502A would increase rapidly, and C504 would charge correspondingly. However, at V502B, the pulse height might be falling almost as fast as, or faster than, the charge can leak off C505, and the 400-c.p.s. saw-tooth voltages here would be nonexistent, or at least much smaller than they would be if the gimbal were displaced slowly by the same amount. Thus, the 400-c.p.s. fundamental at V502A will be large, and will be much larger than normal in the output of V504, due to the absence of the opposing 400 c.p.s. from V502B. Therefore, an extra large restoring torque is put on the gimbal due to the rapid rate of misorientation.

As the gimbal approaches orientation, the pulses across V502A will rapidly decrease from their maximum value, while those across V502B will increase rapidly from their minimum value. Large 400-c.p.s. saw-tooth voltage will appear across V502B, while the pulses across V502A may be decreasing faster than the charge can leak off C504. Hence, the saw-tooth voltages across V502A will diminish or disappear entirely, and the 400-c.p.s. voltage in the output of V503 will again be large, but of the opposite phase, and will supply the necessary restraining torque to keep the gimbal from overshooting the correct position.

*Detecting set rack*

Figure 3:
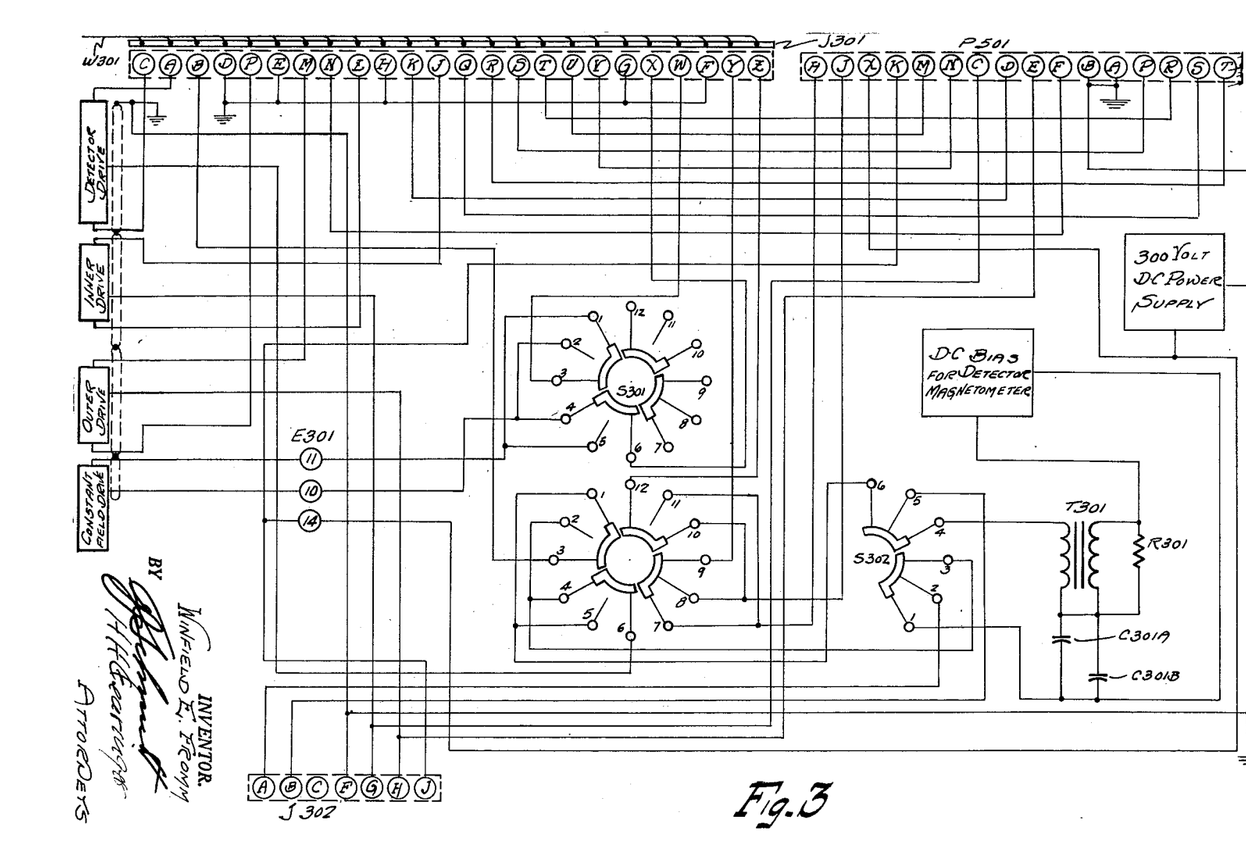
Figure 3 is a schematic diagram of the rack of the magnetic detecting set.

As viewed in Figure 3, the detecting set rack serves to connect various components of the detecting set to each other. Jack J301 and cable W301 connect the rack to jack J401 (Figure 4) and hence the detecting head. Jack J501 (Figure 5) is inserted within plug P501 (Figure 3) in order to connect the rack to the electronic control amplifier.

Because the orientor gimbals are mechanically limited in their rotation to less than 360°, the servo system cannot, without special provision, operate universally in both the northern and southern hemispheres, where the vertical component of the earth's field is in opposite directions. If the phasing of the servo system were such that correct gimbal operation were obtained in the northern hemisphere, then the gimbals would hit against the mechanical stops when attempting to align to detector magnetometer along the earth's field in the southern hemisphere. Thus, for operation in the southern hemisphere, the relative phase of all the constant fields is reversed by means of the north-south switch, which causes the equilibrium positions of the inner and outer gimbals to be 180° from their previous ones, and correct operation will again be possible without the necessity for rotating the entire detecting head 180° around its longitudinal axis. The detector magnetometer axis will still be aligned with the earth's field, but 180° from its previous position with respect to the direction of the field. This necessitates the reversal of the detector magnetometer bias current also performed by north-south switch S301.

*Orientor test unit*

Figure 1:
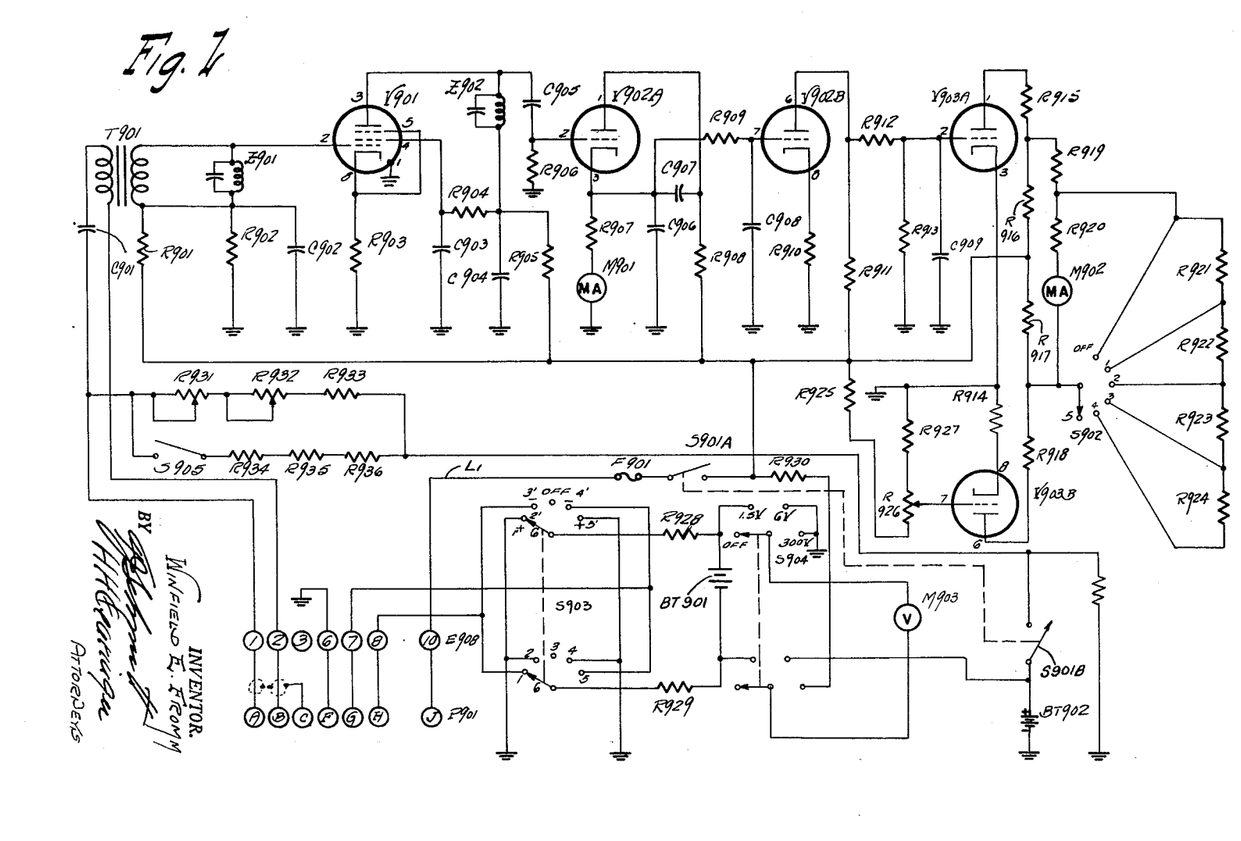
Figure 1 is a schematic diagram of the orientor test unit of the instant invention.

Plug P901 on the orientor test unit is engaged with jack J302 on the rack, as viewed in Figs. 1 and 3, for connecting the test unit to the detecting set. The various connections A, B, C, D, E, F, G, H, I, J on plug P901 are connected to the like lettered connections on jack J302.

Power switch S901A is connected through fuse F901, connection 10 on terminal strip E908, and connection J on plug P901 to a 300 volt D.-C. power supply to thereby provide plate line L1 with a 300 volt potential.

Battery BT902, preferably six volts, is connected through power switch S901B, resistor R933, variable resistor R932, variable resistor R931, ground shielded cable, connection 1 on terminal strip E908, and connection A on plug P901, cable W301 to detector magnetometer coils L405 and L406, as viewed in Figure 4. Series resistors R934, R935, and R936, and test signal switch S905 are connected in parallel with resistors R931, R932 and R933 in the six volt line to allow a known increment of detector magnetometer bias current to flow to provide a calibration of approximately 25 gammas.

The junction of test signal switch S905 and resistor R931 is connected through capacitor C901 to the grounded primary coil of transformer T901. Primary coil of transformer T901 is connected through connnection 2 on terminal strip E908, and connection B on plug P901 to the detector magnetometer output coils L405 and L406, as viewed in Figure 4. As viewed in Figure 1, the core of transformer T901 is connected to ground and to primary coil 1.

Tube V901 is a tuned-grid, tuned plate selective amplifier, which amplifies only the magnetically sensitive 800 cycle per second component of the detector magnetometer output. The control grid 2 of amplifier tube V901 is shielded from ground, and is connected through the secondary coil of T901 and resistor R901 to the 300 volt power supply. Tank Z901 containing a parallel connected inductance and capacitor is connected, as shown, between the control grid and the junction of the secondary coil winding of T901 and resistor R901. The junction of the secondary winding of T901 and resistor R901 is also preferably connected through resistor R902, and through condenser C902 to ground. Cathode 8 of the tube V901 is connected to ground through resistor R903. Suppressor grid 5 is tied to cathode 8. Plate 3 of V901 is connected through the parallel connected coil and capacitance of tank Z902, and resistor R905 to the grounded power supply. The junction of tank Z902 and resistor R905 is connected through capacitor C904 to ground. Screen grid 4 is connected through by-pass capacitance C903 to ground. Screen grid 4 is also connected through resistor R904 to the junction of tank Z902 and resistor R905. The shield of tube V901 is grounded, as viewed in Figure 1.

The 800 cycle per second output of V901 is rectified by V902A. Grid 2 of rectifier V902A is connected to the output coupling capacitor C905 of amplifier V901 and is connected through resistor R906 to ground. Plate 1 of rectifier V902 is connected through resistor R908 to the 300 volt power supply. Cathode 3 of rectifier V902 is connected through capacitor C906 to ground. Residual field meter M901 is connected to cathode 3 through resistance R907. Capacitor C907 is connected across plate 1 and cathode 3.

The output of tube V902A is amplified by the directly coupled amplifier consisting of tubes V902B and V903A. Grid 7 of amplifier tube V902B is connected to the output coupling resistor R909 of rectifier V902A and is connected through capacitor C908 to ground. Cathode 8 of V902B is connected through resistor R910 to ground. Plate 6 of V902B is connected through resistor R911 to the 300 volt power supply. Plate 6 of V902B is also connected through resistor R912 and parallel connected resistor R913 and capacitor C909 to ground.

Grid 2 of amplifier V903A is connected to the output coupling resistor R912 of amplifier V902B. Cathode 3 of tube V903A is tied to cathode 8 of tube V903B. Plate 1 of tube V903A is connected through resistors R915 and R916 to the grounded 300 volt power supply. Plate 1 of tube V903A is also connected through resistors R919 and R920 to signal meter M902.

Output is taken across the plate circuits of V903A and V903B and indicated on signal meter M902. The D.-C. bias on grid 2 of V903A when no signal is present is duplicated at grid 7 of V903B by adjusting signal balance control R926, and signal meter M902 is thereby set to zero indication. A signal which changes the grid bias of V903A will then cause signal meter M902 to indicate either plus or minus.

Control grid 7 of tube V903B is shielded from ground and connected through variable resistance R926 and resistance R925 to the 300 volt power supply. Cathode 8 of V903B is connected through resistance R914 to ground. Variable resistor R926 is connected through resistor R927 to ground. Plate 6 of tube V903B is connected through resistors R919 and R917 to the grounded 300 volt power supply. Plate 6 is also connected through resistor R918 to signal meter M902.

A sensitivity switch S902 is provided for by-passing a variable portion of the output of V903A across the terminals of meter M902. Switch S902 includes five stationary contacts. A wiper arm having a contact for selective engagement with one of said five contacts is connected to one of the terminals of meter M902. Contact 4 of switch S902 is connected through resistors R924, R923, R922, and R921 to meter input resistance R920.

Contact 3 of switch S902 is connected through resistors R923, R922, and R921 to meter input resistance R920. Contact 2 of switch S902 is connected through resistors R922, and R921 to meter input resistance R920. Contact 1 of switch S902 is connected through resistor R921 to meter input resistanace R920. Contact "Off" of switch S902 is directly connected to meter input resistance R920, and contact 5 of switch S902 is an open contact.

Orientation test switch S903 controls the orientor magnetometer bias current from battery BT901 so that it can be passed through either the inner or outer gimbal orientor magnetometer, and can be reversed in direction. Battery BT901 is preferably 1½ volts potential. Resistors R928 and R929 set the amount of bias current so that the gimbal deflection due to this current will be close to 20 degrees of arc. Because the amount of current necessary to give the desired 20 degree deflection varies with the earth's field intensity at the test locality, the value of these resistors must be determined at the test locality.

As viewed in Figure 1, switch S903 comprises two mechanically connected switch arms 6 and 6'. In a first position, switch arm 6 of switch S903 is connected to contact 1 of switch S903 to thereby connect the positive voltage supply line of battery BT901 through a grounded line, resistor R929, contact 1 on switch S903, connection 8 on terminal strip L908, connection H on plug P901, connection H on jack J302 (Figure 3), outer gimbal orientor magnetometer driver, connections P and M on jack J301, line W301, connections P and M on jack J401, outer orientor magnetometer coils L403 and L404 to ground to thereby allow a current to pass in one direction through said magnetometer coils. In this first position, the negative terminal of battery BT901 is connected through a grounded line, resistor R928, arm 6' and contact 1' of switch S903 to ground. In a second position of switch S903, switch arm 6' of switch S903 is connected to contact 2' of switch S903 to thereby connect the negative terminal of battery BT901 through connection 8 on terminal strip E908 to outer orientor magnetometer coils L403 and L404 to thereby allow a current to pass in an opposite direction through said magnetometer coils. In this second position, the positive terminal of battery BT901 is connected through arm 6 and contact 2 of switch S903 to ground. In a third, or "Off" position of switch S903, switch arm 6 is connected to contact 3, switch arm 6' is connected to contact 3' and the switch is open.

In a fourth position of switch S903, switch arm 6' is connected to contact 4' to thereby connect the negative terminal of battery BT901 through connection 7 on terminal strip E908, connection G on jack J302 (Figure 3), inner gimbal orientor magnetometer driver, connections L and J on jack 301, cable W301, and connections L and J on jack 401 (Figure 4), inner orientor magnetometer coils L402 and L401 to ground to thereby allow a current to flow in one direction through said magnetometer coils. In this fourth position, the positive terminal of battery BT901 is connected through arm 6 and contact 5 of switch S903 to ground. In a fifth position of switch S903, switch arm 6 is connected to contact 5 to thereby connect the positive terminal of battery BT901 through connections 7 on terminal strip E908 to inner orientor magnetometer coils L402 and L401 to thereby allow a current to flow in an opposite direction through said magnetometer coils. In this fifth position, the negative terminal of battery BT901 is connected through contact 5' of switch S903 to ground.

A voltmeter M903 together with a voltmeter selector switch S904 is provided for measuring the voltages of batteries BT901 and BT902, and the 300 volt supply. External connector P902 is connected to battery BT402 to allow convenient recharging of battery BT902, or to connect an external battery if desired.

Operation

To make the proper orientation adjustment, the orientor test unit (Figure 1) is connected to the detector magnetometer set through jack J302 and the test operate switch S302 (Figure 3). Power switch S902 on the test unit is turned on and the orientation test switch S903 is thrown so that arms 6 and 6' engage contacts 1 and 1', respectively, to thereby commence the test of the outer gimbal. This causes a small D.-C. test bias current to flow from 1½ volt battery BT901, through resistance R929, switch S903, connection H on rack jack J302, the outer gimbal orientor magnetometer driver, and through connections M and P on rack jack J301 to the outer gimbal orientors L404 and L403, respectively. This sets up a local field along the axis of the outer orientor magnetometer so that it is no longer in zero field when it is at right angles to the earth's field. Resistors R929 and R928 set the amount of bias current so that the gimbal deflection due to this current will be close to 20 degrees of arc. The outer gimbal will therefore be turned by the servo system B402, V506, R538, etc. from its original position until the component of the earth's field along the magnetometer axis nullifies the local field set up by the bias current, and the servo system is again in equilibrium. The detector magnetometer has therefore been turned through the same angle and is now maintained at some angle with the earth's field in the new equilibrium position of the servo system.

Earth field balance controls R931 and R932 are then adjusted so that current from battery BT902 flows through the detector magnetometer coils and biases out to a reference level the component of the earth's field along the axis of the magnetometer. This reference level is established when meter M901 indicates as close as possible to 30 volts. The flow of current from battery BT902 flows through test power switch S901, resistors R933, R932, R931, connection A on jack J302, switch S302, switch S301, the detector driver, and through connections A and C on rack jack J301 to detector magnetometer coils L405 and L406 respectively. Test signal switch S905 allows a known increment of detector magnetometer bias current to flow thus providing a calibration of approximately 25 gammas.

The magnitude of the magnetic field sensed by the detector when the outer gimbal is in its new oriented position is now effectively measured. Sensitivity switch S902 is set as high as is convenient. The reading of signal meter M902 is recorded and the deflection caused by the 25 gamma signal as applied by test signal switch S905 is compared with the deflection caused by the magnetic field being sensed by the detector. An effective record of the deflection caused by the magnitude of the magnetic field sensed by the detector is made within the orientor test unit by adjusting signal balance control R926 to equalize the D.-C. bias on the grids of V903A and V903B until signal meter M902 indicates zero.

Figure 6:
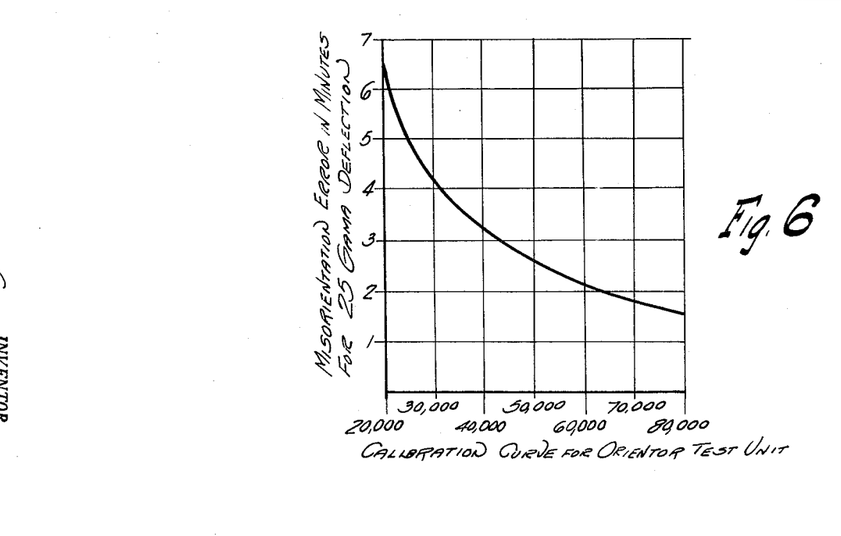
Figure 6 is a calibration curve for the orientor test unit.

Orientation switch arms 6 and 6' are now moved to contacts 2 and 2', respectively, in order to compare the magnetic field measured by the detector magnetometer in the extreme position mentioned above with the opposite extreme position. This causes a small D.-C. test bias current to flow from 1½ volt battery BT901, to bias outer gimbal orientors L403 and L404 in the opposite direction. The current through the outer orientor magnetometer is of exactly the same magnitude as previously but reversed in direction. The outer gimbal will therefore continue to be turned by the servo system B402, V506, R538 etc. from one equilibrium position to another equilibrium position until the component of the earth's field along the magnetometer axis nullifies the local field set up by the bias current and the servo system is again in equilibrium. The new equilibrium position of the gimbal is such that it has been rotated from its original position in the opposite direction but by an equal angle from what it had been previously. The detector magnetometer has been similarly rotated. The deflection of signal meter M902 is now observed. If the signal meter remains in the zero position, the magnitude of the field sensed by the detector magnetometer in one extreme equilibrium position is equal to the magnitude of the field sensed in the other extreme equilibrium position and no adjustment of the gain controls on the amplifier is necessary. If signal meter M902 shows a deflection, this deflection from the zero position is directly proportional to the servo misorientation error, and its magnitude depends upon the intensity of the earth's magnetic field at the test locality. For a meter deflection equal to that produced by 25 gamma test signal switch S905, the servo misorientation error in minutes varies with the earth's field intensity at the test locality as shown in Figure 6. For example, if the 25 gamma signal and the error signal are equal in magnitude as shown by meter M902, and the magnetometer is geographically located at a place on the earth where the earth's magnetic field is 50,000 gammas the misorientation error of the servo system would be 2½ minutes of arc. In other words, the servo system must be adjusted so that outer gimbal motor B402 moves the outer gimbal 2½ minutes of arc from its present oriented position and maintains the gimbal in this corrected new oriented position. This adjustment is made by properly positioning rheostat R538. As a matter of practice, the above procedure is also used to test the inner gimbal and then repeated until the misorientation error is less than one minute of arc for both orientation channels.

Obviously many modifications and variations of the present invention are possible in the light of the above teachings. It is therefore to be understood that within the scope of the appended claims the invention may be practiced otherwise than as specifically described.

What is claimed is:

1. The method of determining when a detector magnetometer having an adjustable servo control for maintaining said detector in a norm position aligned with the earth's magnetic field is properly oriented comprising; displacing said detector in one direction to a second position by applying a known field to said detector, measuring the magnetic field detected by said detector in said second position, displacing said detector in a direction opposite to said one direction to a third position by reversing the polarity of said known field and applying it to said detector, measuring the magnetic field detected by said detector in said third position, and comparing the magnetic fields measured at the second and third positions to thereby determine whether said detector is properly oriented.

2. The method of orienting a detector magnetometer having an adjustable servo control for maintaining said detector in a norm position aligned with the earth's magnetic field comprising; displacing said detector in one direction to a second position by applying a known field to said detector, measuring the magnetic field detected by said detector in said second position, displacing said detector in a direction opposite to said one direction to a third position by reversing the polarity of said known field and applying it to said detector, measuring the magnetic field detected by said detector in said third position, and comparing the magnetic fields measured at the second and third positions, and adjusting said adjustable servo control to thereby establish a new properly oriented norm position.

3. The method of determining when a detector magnetometer having an adjustable servo control for maintaining said detector in a norm position aligned with the earth's magnetic field is properly oriented comprising; displacing said detector approximately 20 degrees in one direction to a second position by applying a known field to said detector, measuring the magnetic field detected by said detector in said second position, displacing said detector approximately 20 degrees in a direction opposite to said one direction to a third position by reversing the polarity of said known field and applying it to said detector, measuring the magnetic field detected by said detector in said third position, and comparing the magnetic fields measured at the second and third positions to thereby determine whether said detector is properly oriented.

4. The method of orienting a detector magnetometer having an adjustable servo control for maintaining said detector in a norm position aligned with the earth's magnetic field comprising; displacing said detector approximately 20 degrees in one direction to a second position by applying a known field to said detector, measuring the magnetic field detected by said detector in said second position, displacing said detector approximately 20 degrees in a direction opposite to said one direction to a third position by reversing the polarity of said known field and applying it to said detector, measuring the magnetic field detected by said detector in said third position, comparing the magnetic fields measured at the second and third positions, and adjusting said adjustable servo control to thereby establish a new properly oriented norm position.

References Cited in the file of this patent

UNITED STATES PATENTS

| | | |
|---|---|---|
| 2,406,870 | Vacquier | Sept. 3, 1946 |
| 2,491,736 | Irwin | Dec. 20, 1949 |
| 2,555,209 | Vacquier | May 29, 1951 |
| 2,564,854 | Muffly | Aug. 21, 1951 |
| 2,615,961 | Means | Oct. 28, 1951 |
| 2,661,455 | Tickner | Dec. 1, 1953 |